(No Model.)

E. C. HILDEBRAND.
SHIFTING SEAT FOR VEHICLES.

No. 267,080. Patented Nov. 7, 1882.

Witnesses:
Wm J. Tanner
Geo H. Cooper

Inventor:
Ev't C. Hildebrand
By W. H. Babcock.
Attorney

UNITED STATES PATENT OFFICE.

ERNEST C. HILDEBRAND, OF NEW HAVEN, CONNECTICUT.

SHIFTING SEAT FOR VEHICLES.

SPECIFICATION forming part of Letters Patent No. 267,080, dated November 7, 1882.

Application filed August 22, 1882. (No model.)

*To all whom it may concern:*

Be it known that I, ERNEST CHARLES HILDEBRAND, a citizen of the United States, residing at New Haven, in the county of New Haven and State of Connecticut, have invented certain new and useful Improvements in Seats for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to folding vehicle-seats and their attachments; and it consists chiefly in the combination of a movable rear seat with an inwardly-folding three-part front seat, hereinafter more particularly described.

It also consists in seat-legs which are attached to the shifting-arms of the rear seat, in combination with supports which are attached to the side bars or other parts of the running-gear, and recessed to receive the lower ends of said legs.

Figure 1:
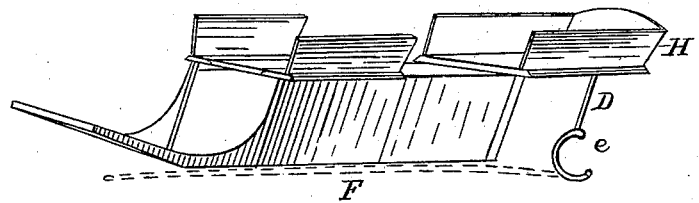
Figure 2:
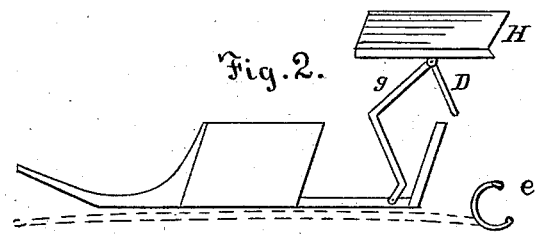
Figure 3:
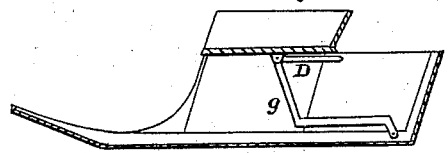
Figure 4:
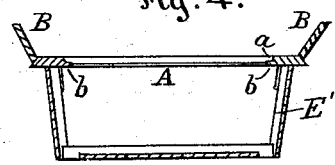
Figure 5:
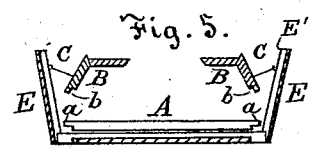
Figure 6:
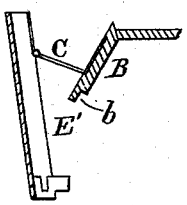
Figure 7:
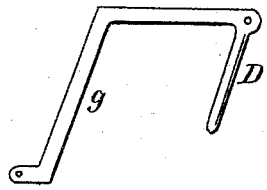

In the accompanying drawings, Figure 1 represents a perspective view of a vehicle body and seats embodying my invention, both seats being ready for use. Fig. 2 represents a side view of the same, (a part of the side being removed,) the front seat having been folded down out of sight, and the rear seat being in transit toward its front position. Fig. 3 represents a vertical longitudinal section, the vehicle being arranged as a single-seat buggy. Fig. 4 represents a transverse section through the front seat and body when arranged as shown in Fig. 1. Fig. 5 represents a transverse section through the front seat and body when the former is folded inward to allow the shifting of the rear seat. Fig. 6 represents a detail view, in enlarged cross-section, of one of the side pieces of the front seat and the contiguous portion of the body; and Fig. 7 represents a detail view, enlarged, of one of the shifting-arms of the rear seat.

In said drawings, A designates the flat middle part of the front seat, which is rabbeted at its edges a, so as to rest upon and be supported by the correspondingly-rabbeted edges b of the side pieces, B, of said seat. These side pieces are angular in form in cross-section, and each of them consists of a small inner horizontal portion, and an outer side wall corresponding to the ordinary arms of a seat. These side pieces are hung, by links c, attached to their horizontal portions, to upright strips E', formed with or secured upon the inside of said body. When the seat is in condition for use, as in Fig. 4, these links are vertical, and rest against the faces of the said strips E', whereby they are prevented from turning outward. A pressure on the middle section, A, of the seat will be transmitted through sections B to the links C, upright strips E', and body E, and as none of these can yield the seat will be locked together. When it is desired to remove the front seat for the purpose of allowing the forward shifting of the rear seat, the middle section, A, is first raised from the sections B, and the latter are then turned inward on links c, so as to allow section A to be slipped down between them, and to lie on the bottom of the body E. These links allow the said side pieces to turn inward into the position shown in Fig. 5, leaving the space formerly occupied by said seat free for the reception of the rear shifting seat. Under such circumstances the middle part, A, of the front seat is deposited in the bottom of the body.

The rear seat, H, is supported on angular shifting arms g, which are pivoted at one end to the rear portion of the buggy-body and at the other and upper end to said seat. At the latter point of attachment each arm g has a rigid bar or seat-leg, D, attached to it. This folds horizontally under the seat when the latter is in its forward position, but extends vertically downward therefrom when the seat is in its rear position. The lower end of each seat-leg D then sets into a recess, e, formed in the top of a support, E, which is attached to the proximate side bar, F, (shown in dotted lines,) or to any other convenient part of the under gearing. These supports and seat-legs provide a secure brace for the rear seat, and obviate all necessity for extending the body of the vehicle back beyond the forward part of said seat.

Having thus fully described my invention, what I claim as new, and desire to secure by Letters Patent, is—

1. In combination with a vehicle-body and a shifting rear seat, the side pieces, B, hinged to the inside of said body, and adapted to turn down within the same, and rabbeted on their inner edges, and the removable central piece, A, adapted to fit upon the said rabbeted edges, substantially as set forth.

2. In combination with recessed supports attached to the under gearing of a vehicle, a pair of seat-legs attached to the shifting-arms of the rear seat, and adapted to set into said supports, substantially as set forth.

3. In combination with the vehicle-body, the shifting seat H, arms $g$, supports $e$, and seat-legs D, the latter being attached to said arms $g$, and arranged to fold horizontally under said seat when it is shifted into its forward position, but to extend vertically downward when said seat is shifted into its rear position, substantially as set forth.

In testimony whereof I affix my signature in presence of two witnesses.

ERNEST C. HILDEBRAND.

Witnesses:
J. GIBB SMITH,
ALBERT L. BLAKESLEE.